(12) United States Patent
Snabb et al.

(10) Patent No.: US 9,598,244 B2
(45) Date of Patent: Mar. 21, 2017

(54) CONVEYOR CHAIN SUPPORT

(71) Applicant: FlexLink AB, Göteborg (SE)

(72) Inventors: Josef Snabb, Göteborg (SE); Daniel Kubiak, Plewiska (PL)

(73) Assignee: Flexlink AB, Göteborg (SE)

( * ) Notice: Subject to any disclaimer, the term of this patent is extended or adjusted under 35 U.S.C. 154(b) by 0 days.

(21) Appl. No.: 15/022,820

(22) PCT Filed: Sep. 15, 2014

(86) PCT No.: PCT/SE2014/051065
§ 371 (c)(1),
(2) Date: Mar. 17, 2016

(87) PCT Pub. No.: WO2015/041592
PCT Pub. Date: Mar. 26, 2015

(65) Prior Publication Data
US 2016/0229640 A1    Aug. 11, 2016

(30) Foreign Application Priority Data

Sep. 18, 2013 (SE) ........................................ 1351073

(51) Int. Cl.
*B65G 15/60* (2006.01)
*B65G 45/00* (2006.01)
(Continued)

(52) U.S. Cl.
CPC ............. *B65G 45/00* (2013.01); *B65G 15/62* (2013.01); *B65G 15/64* (2013.01)

(58) Field of Classification Search
CPC ..... B65G 15/62; B65G 15/64; B65G 21/2072
(Continued)

(56) References Cited

U.S. PATENT DOCUMENTS 4,146,126 A     3/1979   Mattos
4,492,304 A *   1/1985   Geis ..................... B65G 21/20
                                                                                           198/837

(Continued)

FOREIGN PATENT DOCUMENTS

DE    102006053913 A1    5/2008
EP        0960841 A1    12/1999

OTHER PUBLICATIONS

"International Application Serial No. PCT/SE2014/051064, International Search Report mailed Dec. 10, 2014", 4 pgs.
(Continued)

*Primary Examiner* — James R Bidwell
(74) *Attorney, Agent, or Firm* — Schwegman Lundberg & Woessner, P.A.

(57) ABSTRACT

Conveyor chain support for an easy to clean conveyor, where the conveyor chain support comprises an outer peripheral sliding surface adapted to glidingly support a conveyor chain in a return path of the conveyor, where the conveyor chain support is adapted to be attached on a transverse axle of the conveyor in a support position and where the conveyor chain support is a single piece comprising a first jaw and a second jaw joining each other at one end and forming a mouth at the other end, where the conveyor chain support is adapted to be attached on the transverse axle through the mouth. In this way, a conveyor chain support that allows for an easy cleaning of a conveyor is provided for. Such conveyors are e.g. used in the food industry.

15 Claims, 4 Drawing Sheets

(51) Int. Cl.
*B65G 15/62* (2006.01)
*B65G 15/64* (2006.01)

(58) Field of Classification Search
USPC .................................................. 198/837, 841
See application file for complete search history.

(56) References Cited

U.S. PATENT DOCUMENTS

| | | | |
|---|---|---|---|
| 5,190,145 A * | 3/1993 | Ledginham | B65G 21/22 198/841 |
| 5,310,047 A * | 5/1994 | Ledingham | B65G 15/62 198/841 |
| 6,202,834 B1 | 3/2001 | Layne et al. | |
| 6,640,966 B2 * | 11/2003 | Reatti | B65G 15/60 198/841 |
| 7,131,531 B1 * | 11/2006 | Ryan | B65G 15/60 193/35 R |
| 9,296,565 B2 * | 3/2016 | Batchelder | B65G 15/62 |
| 2009/0000923 A1 | 1/2009 | Jager | |
| 2012/0018283 A1 | 1/2012 | Dallner et al. | |

OTHER PUBLICATIONS

"International Application Serial No. PCT/SE2014/051064, International Written Opinion mailed Dec. 10, 2014", 4 pgs.
"International Application Serial No. PCT/SE2014/051065, International Search Report mailed Dec. 10, 2014", 4 pgs.
"International Application Serial No. PCT/SE2014/051065, Written Opinion mailed Dec. 10, 2014", 5 pgs.

* cited by examiner

CONVEYOR CHAIN SUPPORT

PRIORITY APPLICATIONS

This application is a U.S. National Stage Filing under 35 U.S.C. 371 from International Application No. PCT/SE2014/051065, filed on 15 Sep. 2014, and published as WO 2015/041592 on 26 Mar. 2015, which claims the benefit of priority to Swedish Application No. 1351073-0, filed on 18 Sep. 2013; which applications and publications are incorporated herein by reference as if reproduced herein and made a part hereof in their entirety, and the benefit of priority of each of which is claimed herein.

TECHNICAL FIELD

The present invention relates to a conveyor chain support adapted to be used in easy to clean conveyors. The conveyor chain support simplifies the cleaning of the conveyor. The position of the conveyor chain support can easily be changed on the holding axle in order to facilitate cleaning, or the conveyor chain support can easily be removed for extensive cleaning.

BACKGROUND ART

Conveying devices, such as those which are used for moving objects between different stations in a factory, usually comprise a conveying track comprising a belt or a chain. A conveyor track consists of an endless conveyor chain that is supported by conveyor beams. The conveyor chain glides on sliding surfaces on the conveyor beams in order to reduce the friction and the wear. This surface may be the conveyor beam itself or may be an additional component, such as a slide rail. The conveyor track may comprise curves and bends and at the end regions of a conveyor track, there is either a drive unit which drives the chain or an idler end unit which supports the chain for the return path.

There are a number of different designs for such conveyors available. Products may either be conveyed directly on the conveyor belt or chain, or may be conveyed on product carriers. A conveyor chain is made up of a large number of individual chain parts, designed to be able to support the conveyed products. A conveyor system is adapted to different types of products. For some products, such as medical equipments or in lab automation, the environment is clean and dust free, whereas for other products, the environment may be dusty, wet and/or messy. In these cases, it is important that it is relatively easy to clean the conveyor in order to reduce wear of the conveyor and to ensure a reliable operation.

One such industry is the food industry, where various requirements regarding cleanliness are imposed on the handling of goods, mainly to ensure good sanitary conditions in the manufacturing or packaging process. This is necessary to ensure that the food products are not contaminated. Depending on the type of food products, more or less hygienic demands are imposed. In order to meet these requirements, a number of measures are often taken. These include different cleaning schemes, with e.g. washing parts of the conveyor at regular intervals, with a more thorough washing at less frequent intervals. These may include partly disassembling the conveyor system at regular intervals, and removing the chain to allow cleaning the conveyor system and chain.

There are further often requirements on the conveyor system regarding safety. The moving mechanical parts of the system should be enclosed in order to prevent operators from coming into contact with the moving parts of the system. One way of obtaining such a secure conveyor system is to use protective covers arranged close to the moving parts, such that objects such as fingers cannot pass trough. However, such an enclosed conveyor system is more difficult to clean.

Different approaches for the cleaning of hygienic conveyor systems are known. In most systems, the conveyor chain can be raised to a position above the conveyor track, in order to gain access to the interior of the conveyor. The conveyor chain may also be removed to allow both the chain and the conveyor to be cleaned. It is further known to remove other parts of the conveyor, such as covers, guide rails, etc in order to be able to clean all parts of the conveyor.

In most conveyor systems, the conveyor chain is conveyed in return grooves or on slide rails at the lower side of the conveyor. Such a solution is difficult to clean and is thus not an option for e.g. the food industry. A further drawback with this solution is that the conveyor chain is often longer than the conveyor track, in order to allow the conveyor chain to be raised for intermediate cleaning. The return path must thus be able to handle a conveyor chain with an excessive length. The return path is thus normally provided with different types of chain supports between which the conveyor chain hangs down somewhat. The chain supports may be rollers or glide supports. They are normally mounted on transverse axles and fastened with clips or the like. For a thorough cleaning, the supports and the axles are disassembled and removed.

This requires partial disassembly of the conveyor system, which takes a lot of time, effort and manpower. Another problem with the removal of parts is that the parts must be kept somewhere during the cleaning, which also increase the risk of contamination of the removed parts. There is also a risk that fasteners or other parts are lost and not replaced, which may lead to malfunction of the conveyor system.

It is therefore an object of this invention to provide an improved conveyor system structure remedying the deficiencies noted above.

DISCLOSURE OF INVENTION

An object of the invention is therefore to provide an improved conveyor chain support for a conveyor, which facilitates the cleaning of the conveyor. A further object of the invention is to provide a conveyor which is easy to clean.

The solution to the problem according to the invention is described in the characterizing part of claim 1 with regards to the conveyor chain support and in claim 11 with regards to the conveyor. The other claims contain advantageous embodiments and further developments of the conveyor chain support and the conveyor.

In a conveyor chain support for an easy to clean conveyor, where the conveyor chain support comprises an outer peripheral sliding surface adapted to glidingly support a conveyor chain in a return path of the conveyor, where the conveyor chain support is adapted to be attached on a transverse axle of the conveyor in a support position, the object of the invention is achieved in the conveyor chain support is a single piece comprising a first jaw and a second jaw joining each other at one end and forming a mouth at the other end, where the conveyor chain support is adapted to be attached on the transverse axle through the mouth.

By this first embodiment of the conveyor chain support according to the invention, the conveyor chain support allows for an easy cleaning of a conveyor, where the return chain with the supports can be cleaned without having to remove each conveyor chain support. The conveyor chain support can be moved from a support position in which the conveyor chain support is attached to a transverse axle in order to support the return chain, to a cleaning position in which the conveyor chain support and the axle can be cleaned without having to remove the conveyor chain supports. The attachment opening of the conveyor chain support is further provided with cut-outs or voids which further enhance the cleaning of each conveyor chain support.

In this way, regular washing can be made in an easy and time-efficient way. Such washing is made in regular time periods, e.g. once a day or every four hours. An advantage of this is that the conveyor chain support does not have to be removed for the cleaning. Each conveyor chain support can, when required, also be removed individually from the transverse axle, which may be advantageous when a more thorough washing of the conveyor is to be made or when a conveyor chain support is to be replaced.

The conveyor chain support is preferably made as a single piece, without any joints or crevices where contaminations may be caught. In this way, a conveyor chain support with a smooth outer surface which is easy to clean and which has a low friction value can be provided. A suitable material is e.g. a low friction material such as HDPE. The conveyor chain support is preferably made in an injection moulding process.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
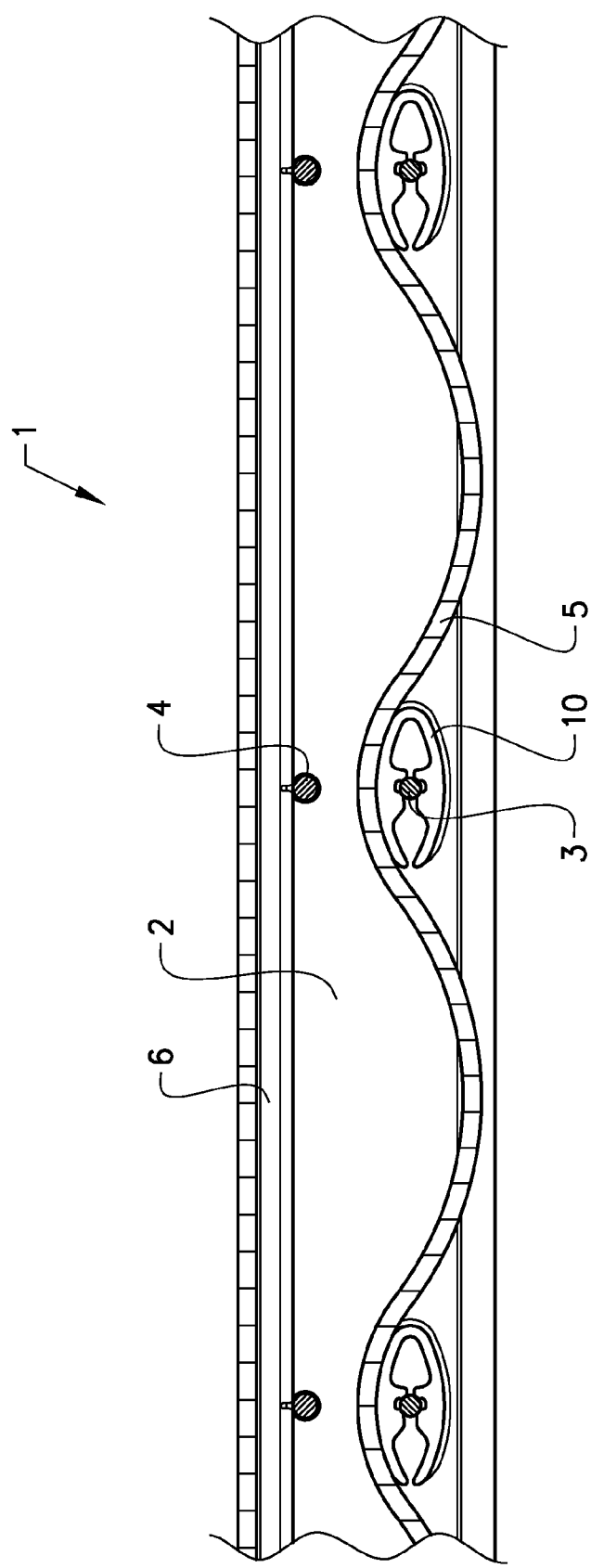
FIG. 1 shows a cut side view of a conveyor comprising a conveyor chain support according to the invention.
Figure 2:
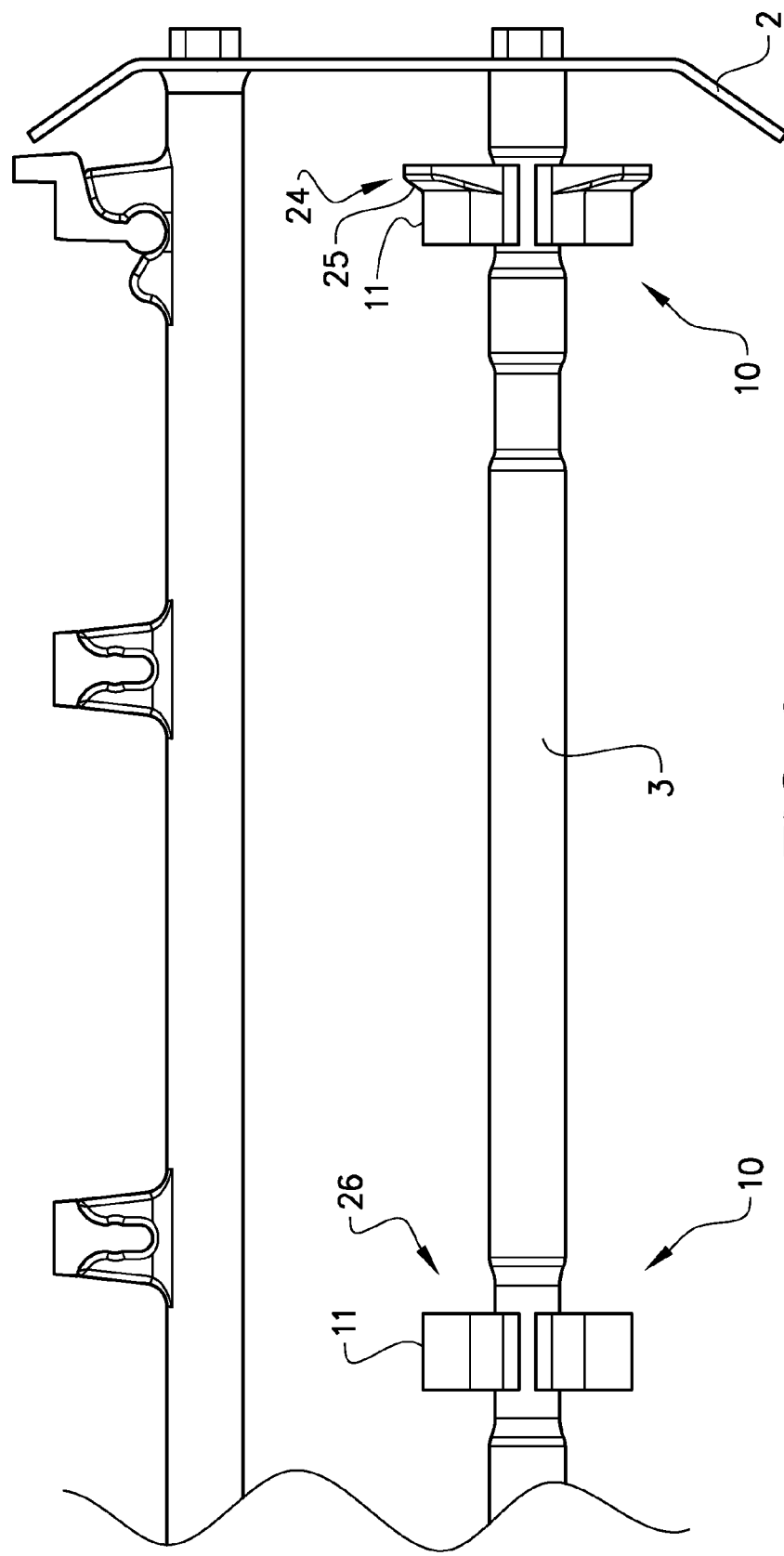
FIG. 2 shows a front view of a conveyor having a plurality of conveyor chain supports according to the invention.

FIG. 1 shows a cut side view of a conveyor comprising a conveyor chain support according to the invention. FIG. 2 shows a front view of a conveyor comprising a conveyor chain support according to the invention. The conveyor 1 comprises side walls 2. The side walls acts in this example both as longitudinal beams which supports the conveyor and as protective covers which prevents fingers and other objects to get caught between a guide rail and the protective cover and to reach the inner of the conveyor. The required safety requirements can thus be met by the conveyor. The conveyor further comprises a plurality of transverse rods 4 and transverse axles 3 interconnecting the side walls which are arranged to support a conveyor chain 5. The conveyor further comprises a drive unit in one end and an idler unit in the other end of the conveyor (not shown).

The transverse rods 4 are provided with guide rails 6 and slide supports for a conveyor chain in order to support and guide the conveyor chain in a forward direction. The guide rails and the support rails provide a flat upper bearing plane for the conveyor chain 5. The upper surface of the support rails are preferably made from a low friction material such that the conveyor chain can easily glide on the support rails. At the same time, the support rails must be relatively stiff such that they can support the conveyor chain and the transported goods such that the longitudinal spacing between two transverse rods 4 can be relatively long.

The transverse axles 3 support the conveyor chain in the return path of the conveyor. Each transverse axle is provided with several return supports 10 which allows the conveyor chain to glide on the return supports in an energy efficient way. The return supports are preferably oval such that the conveyor chain can glide easily even though the conveyor chain is having an excessive length. The purpose of the excessive length is to be able to raise the conveyor chain when cleaning in order to provide access to the inner of the conveyor.

Figure 3:
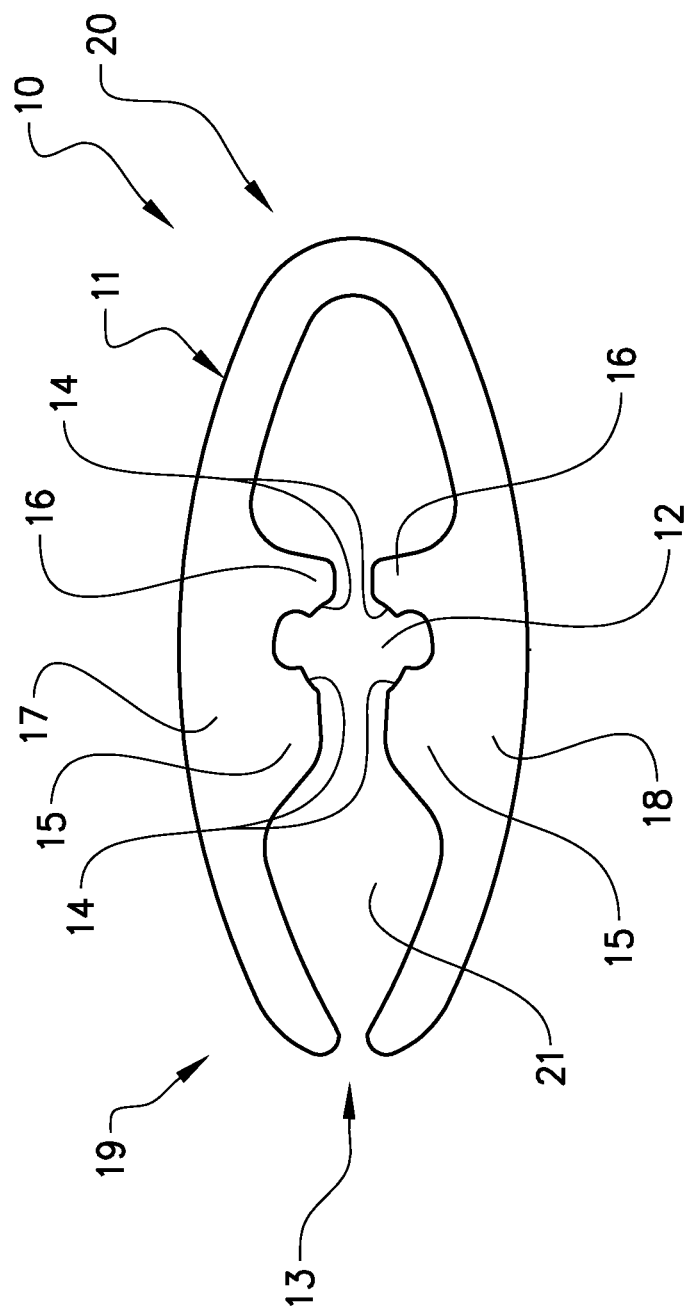
FIG. 3 shows the conveyor chain support according to the invention.

FIG. 3 shows a conveyor chain support 10. The conveyor chain support is preferably made as a single piece and comprises a first jaw 17 and a second jaw 18 interconnected to each other at a rear end 20. The conveyor chain support is provided with an outer sliding surface 11 which extends over the complete outer circumference of the conveyor chain support. The conveyor chain support is further provided with a mouth 13 at a front side 19 of the conveyor chain support. Centrally in the conveyor chain support, an attachment opening 12 is provided, which is adapted to cooperate with an attachment section of a transverse axle of the conveyor. The attachment opening is provided between two front protrusions 15 and two rear protrusions 16. Each protrusion is provided with an inner bearing surface 14, which will bear against the attachment section of a transverse axle. Preferably, the bearing surfaces 14 only extend over part of the circumference of the support opening, such that cleaning of the conveyor chain support is facilitated.

The conveyor chain support is adapted to be attached on the transverse axle through the mouth, which will flex somewhat to allow the axle to enter. The axel is further inserted between two front protrusions 15 in order to reach the attachment opening 12. The conveyor chain support may be attached on an attachment section in any direction and in any position, i.e. the front end of the conveyor chain support may be directed to or from the travelling direction of the conveyor chain, and the first or the second jaw may be directed upwards, towards the conveyor chain.

Figure 4:
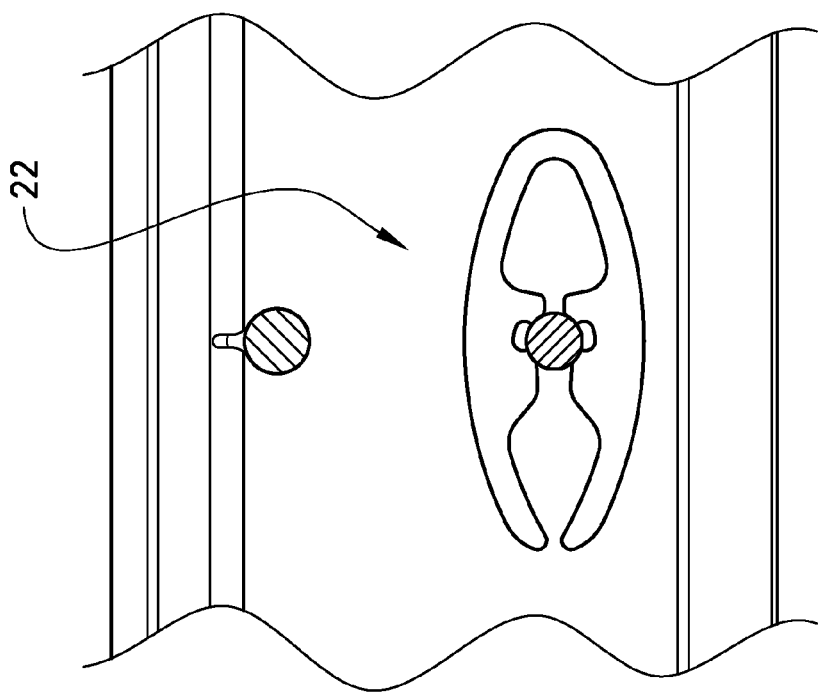
FIG. 4 shows the conveyor chain support according to the invention in a support position.

In FIG. 4, a conveyor chain support is shown in a support position 22, in which it is attached to an attachment section of a transverse axle. The four bearing surfaces 14 all bear on the surface of the attachment section. In this position, the conveyor chain support will support a conveyor chain in the return path of a conveyor. In easy to clean conveyors which are adapted to carry e.g. food products, the conveyor chain is normally provided with an excessive length such that the conveyor chain can be lifted to allow the inner side of the conveyor to be cleaned. The conveyor chain will thus not travel in grooves in the return path. Instead, the conveyor chain will hang between the return supports of the different transverse axles. It is thus of advantage that the shape of a conveyor chain support is oval or elliptic and not round. With an oval shape, the conveyor chain support will not rotate but the conveyor chain will slide on the sliding surface.

Figure 5:
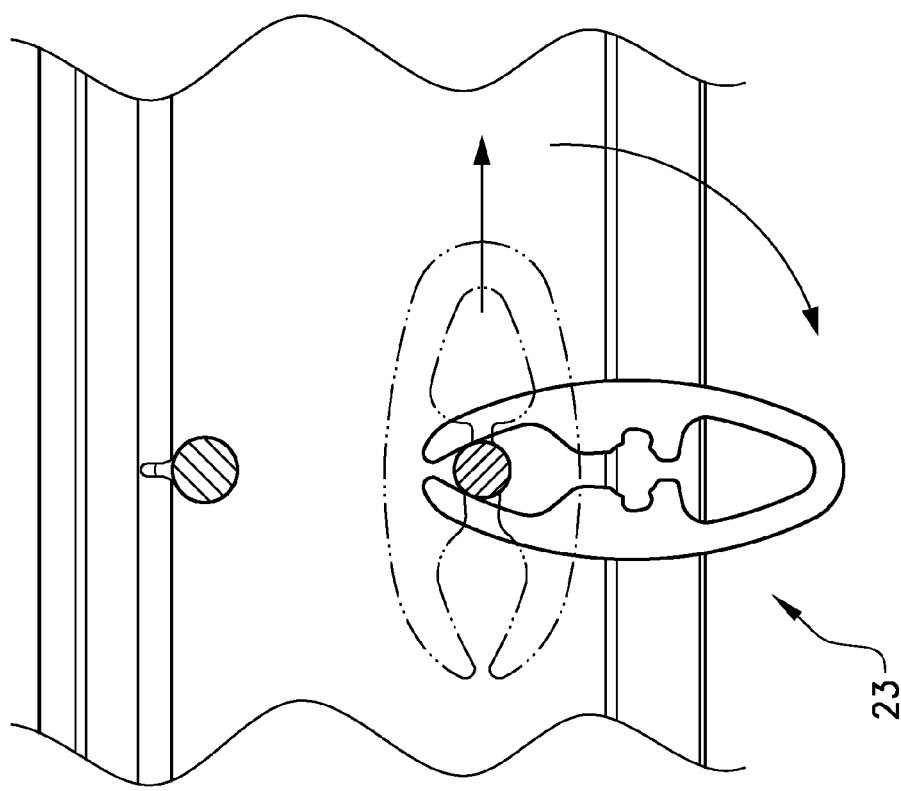
FIG. 5 shows the conveyor chain support according to the invention in a cleaning position.

When the conveyor is to be cleaned, it is of advantage to be able to move the conveyor chain support to allow for cleaning without having to remove the conveyor chain support completely from the transverse axle. For regular cleaning, or when the hygienic requirements are less demanding, it may suffice to move the conveyor chain support sideways in the attachment section. For a more thorough cleaning, the conveyor chain support is preferably moved to a cleaning position 23, as shown in FIG. 5. In this position, the conveyor chain support is moved from the attachment section but is still held by the transverse axle. The conveyor chain support hangs on either the transverse axle or on an attachment section by a jaw opening 21. In this position, both the attachment section of a transverse axle and the attachment opening of a conveyor chain support can easily be cleaned. When the cleaning is completed, the conveyor chain support is easily snapped back to the support position by an operator. It is of course also possible to remove the conveyor chain support completely through the mouth, either for a thorough cleaning or for replacement.

It is also possible to use the rear part of the conveyor chain support as a cleaning position by designing the rear protrusions such that the conveyor chain support can be moved towards the rear of the conveyor chain support. In this rear cleaning position, the conveyor chain can still be supported by the conveyor chain support, and there is no risk that the conveyor chain support will snap off the transverse axle.

One advantage of the inventive conveyor chain support is that it is easy to mount and remove individual conveyor chain supports without having to disassemble the conveyor by removing the transverse axle in order to remove the conveyor chain supports. This will allow for hygienic conveyors where the axles are welded to the side beams, since there is no need to be able to remove the axles.

It is also possible to provide a conveyor chain support with an inclined section 24, as shown in FIG. 2. The inclined section is adapted to guide a conveyor chain sideways in the return path. The inclined section is provided with an inclined bearing surface 25 which will help in guiding a conveyor chain in a sideway direction. The conveyor chain will glide on the sliding surface 11 and will be guided by the inclined section when necessary. The angle of the inclined bearing surface is preferably between 120 degrees and 150 degrees relative the sliding surface of the conveyor chain support.

The transverse axles are provided with attachment sections 26, each adapted to receive a conveyor chain support 10. The diameter of an attachment section is smaller than the diameter of the transverse axle. The width of an attachment section is at least as wide as a conveyor chain support, but is preferably wider and may e.g. be at least twice as wide as a conveyor chain support. In this way, the conveyor chain support can move slightly in a sideway direction which reduces the wear of the conveyor chain and facilitates the cleaning of the conveyor chain support and the transverse axle. By using attachment sections with a smaller diameter than the axle, the conveyor chain support can be attached to the transverse axle without the need of clips or the like, which further facilitates the cleaning of the conveyor and reduces the required cleaning time.

The conveyor chain support is preferably used for hygienic purposes, where it is important that the conveyor does not comprise any hidden spaces where contaminations, bacteria etc can hide. Such conveyors must also be easy to clean. By providing a conveyor chain support that is easily moved between a support position and a cleaning position without having to remove the conveyor chain support, the conveyor will be easy to clean. The conveyor chain support is also suitable for use in all types of conveyor systems where conveyor chain supports are used in the return path.

The invention is not to be regarded as being limited to the embodiments described above, a number of additional variants and modifications being possible within the scope of the subsequent patent claims. The conveyor chain support may have any size and may be made from any suitable material. Other shapes are also possible.

REFERENCE SIGNS

1: Conveyor
2: Side wall
3: Transverse axle
4: Transverse rod
5: Conveyor chain
6: Guide rail
10: Return support
11: Outer sliding surface
12: Attachment opening
13: Mouth
14: Inner bearing surface
15: Front protrusion
16: Rear protrusion
17: First jaw
18: Second jaw
19: Front end
20: Rear end
21: Jaw opening
22: Support position
23: Cleaning position
24: Inclined section
25: Inclined bearing surface
26: Attachment section

The invention claimed is:

1. A conveyor chain support for an easy to clean conveyor, where the conveyor chain support comprises:
an outer peripheral sliding surface which extends over the complete outer circumference of the conveyor chain support and is adapted to glidingly support a conveyor chain in a return path of the conveyor, wherein the conveyor chain support is adapted to be attached on a transverse axle of the conveyor in a support position, wherein the conveyor chain support is a single piece comprising a first jaw and a second jaw joining each other at one end and forming a mouth at the other end wherein the conveyor chain support is adapted to be attached on the transverse axle through the mouth.

2. The conveyor chain support according to claim 1, wherein each jaw comprises a front protrusion and a rear protrusion arranged congruent to each other, such that an attachment opening is formed there between, where the front protrusions and the rear protrusions are adapted to bear against the transverse axle on inner bearing surfaces in the support position.

3. The conveyor chain support according to claim 1, wherein the conveyor chain support further comprises a cleaning position which is separate from the support position.

4. The conveyor chain support according to claim 3, wherein the cleaning position is arranged in between the first and second jaws, between the mouth and the front protrusions.

5. The conveyor chain support according to claim 3, wherein the cleaning position is arranged in the rear of the conveyor chain support, between the rear end and the rear protrusions.

6. The conveyor chain support according to claim 1, wherein the conveyor chain support is oval.

7. The conveyor chain support according to claim 1, wherein an attachment opening is provided with a plurality of inner bearing surfaces arranged spaced apart with voids in between.

8. The conveyor chain support according to claim 2, wherein the distance between the front protrusions is larger than the distance between the rear protrusions.

9. The conveyor chain support according to claim 1, wherein the outer sliding surface is provided with an inclined circumferential section adapted to guide a conveyor chain sideways.

10. The conveyor chain support according to claim 9, wherein an inclined bearing surface of the inclined section is between 120 degrees and 150 degrees relative to the sliding surface of the conveyor chain support.

11. A conveyor comprising:
a conveyer chain support, the conveyer chain support comprising:
an outer peripheral sliding surface which extends over the complete outer circumference of the conveyor chain support adapted to glidingly support a conveyor chain in a return path of the conveyor, wherein the conveyor chain support is adapted to be attached on a transverse axle of the conveyor in a support position wherein the conveyor chain support is a single piece comprising a first jaw and a second jaw joining each other at one end and forming a mouth at the other end wherein the conveyor chain support is adapted to be attached on the transverse axle through the mouth.

12. The conveyor according to claim 11, wherein the conveyor comprises two longitudinal carrying beams and a plurality of transverse axles, where each transverse axle is provided with a plurality of attachment sections, where the diameter of an attachment section is smaller than the diameter of the transverse axle.

13. The conveyor according to claim 12, wherein the width of an attachment section is at least twice as wide as a conveyor chain support.

14. The conveyor according to claim 11, wherein the conveyor chain support is moved from the support position to a cleaning position by a pulling action.

15. The conveyor according to claim 11, wherein the conveyor chain support is detached from the transverse axle through the mouth by a pulling action.

* * * * *